(12) United States Patent
Liebig

(10) Patent No.: US 6,851,266 B2
(45) Date of Patent: Feb. 8, 2005

(54) METHOD FOR MAINTAINING A COMBINED-CYCLE POWER STATION AT READINESS

(75) Inventor: Erhard Liebig, Laufenburg (DE)

(73) Assignee: Alstom Technology LTD, Baden (CH)

( * ) Notice: Subject to any disclaimer, the term of this patent is extended or adjusted under 35 U.S.C. 154(b) by 0 days.

(21) Appl. No.: 10/676,037

(22) Filed: Oct. 2, 2003

(65) Prior Publication Data
US 2004/0065089 A1 Apr. 8, 2004

Related U.S. Application Data

(63) Continuation of application No. PCT/IB02/01117, filed on Apr. 5, 2002.

(30) Foreign Application Priority Data

| Apr. 6, 2001 | (DE) | ............................. 101 17 101 |
| Apr. 6, 2001 | (DE) | ............................. 101 17 102 |
| Apr. 25, 2001 | (CH) | ............................. 2001 0759/01 |

(51) Int. Cl.$^7$ ................. F02C 1/00; F02C 6/18
(52) U.S. Cl. ......................... 60/772; 60/39.182
(58) Field of Search ............... 60/773, 39.181, 60/39.182, 793, 772

(56) References Cited

U.S. PATENT DOCUMENTS

| 4,201,924 A |   | 5/1980 | Uram ..................... 290/40 R |
| 5,172,553 A |   | 12/1992 | Barton et al. ................. 60/656 |
| 5,678,401 A | * | 10/1997 | Kimura ................... 60/39.182 |
| 6,244,033 B1 | * | 6/2001 | Wylie ......................... 60/783 |
| 6,286,297 B1 | * | 9/2001 | Wakazono et al. ............. 60/783 |

FOREIGN PATENT DOCUMENTS

| EP | 0 768 449 A1 | 4/1997 |
| EP | 0 889 204 A2 | 1/1999 |
| EP | 0 889 204 A3 | 9/2001 |
| WO | WO 02/081870 | 10/2002 |

OTHER PUBLICATIONS

Search Report in PCT/IB02/01117 dated Jul. 5, 2002.

* cited by examiner

Primary Examiner—Charles G. Freay
(74) Attorney, Agent, or Firm—Cermak & Kenealy LLP; Adam J. Cermak

(57) ABSTRACT

In a method for maintaining a combined-cycle power station at readiness, an supplemental firing (44) with a fresh air supply fan (46) and, preferably, the feed and supply pumps (21, 23, 31, 38) are operated continuously or intermittently when the combined-cycle power station is not in use, in order to maintain specific states and media flows in the two-phase circuit of the combined-cycle power station. In one embodiment of the invention, the media in the two-phase circuit are prevented from freezing by means of the supplemental firing. Furthermore, media states which prevent air from entering while the power station is not in use and which thus prevent corrosion damage can also be maintained. In addition to this protective maintenance of readiness, the supplemental firing is also used when the combined-cycle power station is not in use, in order to produce and maintain conditions which allow the combined-cycle power station to be started and loaded quickly.

16 Claims, 5 Drawing Sheets

METHOD FOR MAINTAINING A COMBINED-CYCLE POWER STATION AT READINESS

This application is a continuation of, and claims priority under 35 U.S.C. § 120 to, International Application PCT/IB02/01117, filed 5 Apr. 2002, which designated the U.S. and was published in German as WO 02/081870 on 17 Oct. 2002. This application also claims priority to: German application number 101 17 101.3, filed 6 Apr. 2001; German application number 101 17 102.1, filed 6 Apr. 2001; and Swiss application number 2001 0759/01, filed 25 Apr. 2001.

TECHNICAL FIELD

The present invention relates to a method for maintaining a combined-cycle power station ready for start-up.

PRIOR ART

In the liberalized electricity supply markets, the dynamic response of power stations is becoming increasingly important. Owing to the major price differences for different times of day and different times in the year in the electricity market, it is therefore becoming ever less worthwhile operating a power station at times when the electricity tariffs are low. In a corresponding way, there is a requirement for suitable capabilities to take combined-cycle power stations out of operation at times when the electricity tariffs are low, and to take them out of operation at night, as well as at weekends, holiday periods or at times when extensive hydro-electric power resources are available, and to maintain these power stations in a safe readiness mode over a lengthy time period, which then also allows them to be restarted quickly.

The "outdoor configuration" of combined-cycle power stations, which is intended to save capital, results not least in this context in the consequence that measures must be taken for periods in which the power station is not in use to prevent damage resulting from these periods, for example frost damage. According to the prior art, antifreeze agents are, for example, added to the media in the circulation systems, although this leads to a poorer heat transmission behavior and thus has a negative influence on the system design.

However, antifreeze agents cannot be used in systems with high purity requirements or where specific chemicals are used, for example in water/steam circuits. Furthermore, water/chemical measures such as these are not economic, particularly for partially open systems. The use of chemicals is also increasingly being avoided for environmental protection reasons. Direct or indirect electrical heating, possibly combined with appropriate insulation, auxiliary pumps or specific small boilers and the like are therefore being provided for certain systems in order, inter alia, to prevent the temperature of the media from falling below critical values. It is, of course, also possible to empty the circulation systems, or to drain the water from them, with them subsequently possibly being dried out, for example by means of hot air. However, opening the systems leads to the ingress of air and, in consequence, necessarily leads to corrosion. For this reason, even protection for periods when the power stations are not in use, in order to prevent corrosion, is required in certain conditions. However, these options are feasible, if at all, only when particularly long shut-down periods occur or in conjunction with servicing or maintenance work.

When a power station system is not in use, sealing systems or air extraction from systems and components which operate in the reduced pressure range, such as low-pressure steam turbines and condensers, are not operated. In systems and components which otherwise operate in the increased pressure range, such as supply water containers/degassers and steam drums, cooling down can result in them reaching the ambient pressure, or even a reduced pressure. These are further critical areas with regard to corrosion resulting from the ingress of air.

The precautions according to the prior art for protecting combined-cycle power stations when they are not in use have the disadvantage, inter alia, that a large number of different, generally expensive measures must be taken for the large number of systems and components to be protected in present-day combined-cycle power stations. These measures also serve exclusively to prevent damage while the power stations are not in use; they are generally irrelevant to normal operation of the system and are possibly even disadvantageous during normal operation.

When it is intended to restart the system, the total system power output should be available as quickly as possible. While the gas turbo group in a combined-cycle system can be connected to the grid and loaded comparatively quickly, the downstream two-phase circuit, generally a water/steam circuit, is comparatively slow to react. On the one hand fresh steam must be available with the minimum of required parameters; on the other hand, the components of the water/steam circuit have a large number of comparatively thick-walled components which can be raised to the operating temperature only slowly. The prior art for the widely differing combined-cycle power station systems which are installed throughout the world in this case provides various possible ways to ensure reliable starting of the two-phase circuit. By way of example, operating concepts exist, in which holding points are defined for the gas turbo group, in order to heat up the two-phase circuit in small steps. Methods such as these may, on the one hand, not be suitable for operation of the gas turbo group, and the overall system produces its full output power only very slowly, and in the worst case only after several hours. It is also known for the gas turbine to be started comparatively quickly and for steam which is produced but cannot be used owing to the steam parameters being inadequate and/or owing to the steam turbine components not yet having been sufficiently preheated to be disposed of in a bypass, and for the steam turbine to be started only slowly. In this case as well, a long time can pass until the combined cycle system is delivering its full power output.

DESCRIPTION OF THE INVENTION

The invention is based on the object of specifying a simple and cost-effective method for maintaining a combined-cycle power station ready for start-up as claimed in claim 1, In particular the invention shall allow the system to be out of operation for extended periods of time without the measures which have a negative influence on operation of the power station as well as allowing rapid starting and loading to the full system load.

This is achieved by all of the features in claim 1.

Thus, according to the invention, a combined-cycle power station must first of all be equipped in a manner known per se with an supplemental firing in the waste-heat steam generator, and a fresh air supply fan must be provided to allow operation of the supplemental firing even when the combined-power station is not in use. Although this arrangement intrinsically belongs to the prior art, the essence of the invention can be seen in the particular method of operation of the supplemental firing as. This is because the supplemental firing together with the fresh air supply fan is operated continuously or intermittently when the power station is not in use, with the operation of the supplemental firing being controlled so as to ensure that specific state variables and media flows are produced and/or maintained in the two-phase circuit, which essentially comprises a waste-heat steam generator and a steam turbine and is generally a water/steam circuit, for the combined-cycle power station. In this case, feed and/or supply pumps in the two-phase circuit are also preferably operated continuously or intermittently while the combined-cycle power station is not in use in order in addition to pass the heat, which is intrinsically produced only at the heat recovery steam generator, to other components of the two-phase circuit as well.

In a first embodiment of the invention, the supplemental firing is operated when the power station system is not in use such that power station system states and parameters are maintained which are significant to prevent damage while the power station is not in use. In this context, significant means that these parameters may assume values when the power station is not in use which lead to damage to the systems and components (frost damage, corrosion etc.). These parameters in this case relate essentially to the two-phase circuit, but also to auxiliary and ancillary systems (main cooling system, closed cooling system, etc.). For all of these systems and components, it is necessary to ensure parameters which reliably prevent damage even when the power station is not in use.

Surprisingly, this protection function can be carried out universally by an supplemental firing with a fresh air supply fan; there is thus no longer any need for a large number of different measures for various systems in a power station and, instead, a number of systems can be maintained in a safe shutdown condition by means of one, or else a number of, supplemental firings with a fresh air supply fan. The fresh air supply fan is necessary in this case since the supplemental firing can otherwise not be operated when the gas turbine system is not in use. In this case, and in contrast to chemical methods, the supplemental firing can be operated in a flexible manner as a function of the specific boundary conditions, for example as a function of the outside temperature. In addition, an supplemental firing results in the major advantage that this supplemental firing can be used sensibly not only for safe maintenance when the power station is not in use, but also for operation of the system, for example to produce additional power at peak load times, which is not the case when conventional measures are used, such as electrical heaters and/or chemical additives. The solution has, of course, been found to be particularly advantageous for the "outdoor configuration" that has been mentioned, that is to say when the main systems of the power station are installed at least partially in the open air, and frost protection is a central objective in this case.

In a further embodiment of the invention, the supplemental firing is operated when the power station system is not in use such that power station system states and parameters are brought to and/or maintained at values which are essential for unimpeded and rapid starting of the combined-cycle power station. Essential in this context means that, without further measures, these parameters can assume values when the power station is not in use which do not allow the combined-cycle power station to be started rapidly and without any holding points, without in the process reducing the life of the components or provoking an unstable behavior. These parameters may in this case relate to the gas turbo group and/or to the heat recovery steam generator and/or to the two-phase circuit, since specific boundary conditions must be satisfied for rapid starting, without any time delay and without any holding points. The fresh air supply fan is required in this case since, otherwise, the supplemental firing cannot be operated when the gas turbo group is not in use.

In one method of operation, the supplemental firing is operated in order to maintain the temperature of the working medium which is carried in the two-phase circuit of the combined-cycle power station above its freezing point.

In order to avoid or to reduce corrosion, particularly resulting from the ingress of air, the supplemental firing can be operated in order to ensure states and parameters in which emptying facilities and venting facilities remain closed, and in order to keep systems for sealing and for air extraction in operation. With regard to the latter aspect, the supplemental firing is thus operated in order to provide an amount of steam which is required for operation of the barrier steam and barrier vacuum systems.

In a further embodiment of the invention, the supplemental firing is operated in order to maintain the temperature of the media which are contained in the two-phase circuit, generally water, such that the vapor pressure maintains a system pressure at which emptying facilities and/or venting facilities are not opened, thus preventing the ingress of air. Water extraction facilities and venting facilities within the individual systems of the two-phase circuit are opened and closed on the basis of various criteria, that is to say air flows into the system in the open state, which results in increased corrosion or may necessitate counter measures. This applies in particular to water-vapor systems being cooled down below 100° C. since a reduced pressure can occur in the system below this temperature, resulting in the expectation of the ingress of air. One possible way to counteract this is nitrogen inflation at pressures below 1 to 3 bar, or else operation of the supplemental firing according to the invention in order to maintain a specific minimum temperature, and hence a minimum required pressure.

The method according to the invention can also advantageously be used in order to protect cooling systems against freezing, in particular a cooling water inlet as well. The supplemental firing can likewise be operated in order to maintain the flow capabilities of heavy oils and crude oils that are used as fuel and, in extremely low outside temperatures, to maintain the flowing capabilities of diesel oil and lubricating oil, as well as hydraulic fluid.

A further preferred variant of the method according to the invention can be used in an analogous manner in order to maintain or keep the power station ready for rapid starting and for loads to be applied rapidly. In this case, in a first preferred variant, the supplemental firing is operated when the power station is not in use in order to set the temperature of components in the two-phase circuit above a predetermined minimum temperature by means of an amount of heating liquid and/or an amount of steam. For example, the supplemental firing is used to maintain the temperature of components (which, in particular, have thick walls) of the heat recovery steam generator and/or of pipelines and/or of rotors and housings in the two-phase circuit at values that are above the critical starting temperatures, by liquid and/or steam that has been heated in the heat recovery steam generator flowing through and/or around the components. It is particularly advantageous to set the minimum temperature for the fresh steam flange of the steam turbine to be above the minimum temperature. This allows the steam turbine to be loaded rapidly, without the long holding times which are otherwise required.

It is also advantageous, prior to starting, to operate supplemental firing such that suitable fresh steam states for operation of the steam turbine can be achieved in the heat recovery steam generator as quickly as possible after synchronization of the gas turbo group.

In a further embodiment, the temperature of the medium in containers in the two-phase circuit is kept above a minimum temperature by means of the supplemental firing. This on the one hand provides the safety as mentioned above against the ingress of air, and on the other hand provides a large thermal potential, which considerably reduces the inertia of the two-phase circuit during starting.

The operation of the supplemental firing can also be used in order to provide the amount of heating steam or heating liquid that is required to provide and maintain a degassed amount of condensate, in particular an amount of supply water.

The supplemental firing can likewise be used in order to provide an amount of steam for operation of an evacuation ejector for a condenser in the two-phase circuit, such that the condenser can be evacuated even while the gas turbo group is not in use or while it is being started, in order to start the steam turbine essentially without any delay.

It is known for gas turbo groups to be designed with steam cooling, in which case the steam must be available as early as possible. Furthermore, methods are known in which steam is injected into the gas turbo group for a starting process that provides protection, or to provide a power gradient which is as steep as possible, or to reduce nitrogen oxides. It is advantageous, both for steam cooling and for steam injection, for steam to be available as early as possible. An supplemental firing allows steam to be provided at any desired times with respect to the process of starting the gas turbo group. Steam of a quality which can be used for the steam turbine, that is to say with fresh steam parameters which are suitable for operation of the steam turbine, should, of course, also be available as early as possible for rapid loading of the entire combined-cycle power station. The method according to the invention is advantageously used for this purpose as well.

In the interest of rapid and reliable starting, the method according to the invention is advantageously used in order to preheat lubricating oil and liquid fuels.

According to a further embodiment, the fresh air supply fan can be used to purge the heat recovery steam generator and the chimney with fresh air before and/or during the starting of the system. Before a gas turbo group is ignited, the downstream systems must normally be purged with air while maintaining specific parameters (time, rate, speed, mass and body flow) in order to blow out any combustible substances which may be present. For this purpose, according to the prior art, the gas turbo group must be rotated at a specific rotation speed for a specific time, and this is done by means of a starting converter and by operating the generator as a motor. According to one aspect of the invention, the fresh air supply fan can be used effectively for purging, while other steps to prepare for starting can be carried out in parallel, thus further shortening the overall starting times.

BRIEF EXPLANATION OF THE FIGURES

The invention will be explained in more detail in the following text with reference to an exemplary embodiment which is illustrated in the drawing, which is intended to illustrate the invention, but restrict its application. The five figures all show the same power station system, with different systems that are relevant in conjunction with the invention being illustrated in the various figures, in the interest of better clarity. In detail.

APPROACHES TO IMPLEMENTATION OF THE INVENTION

Figure 1:
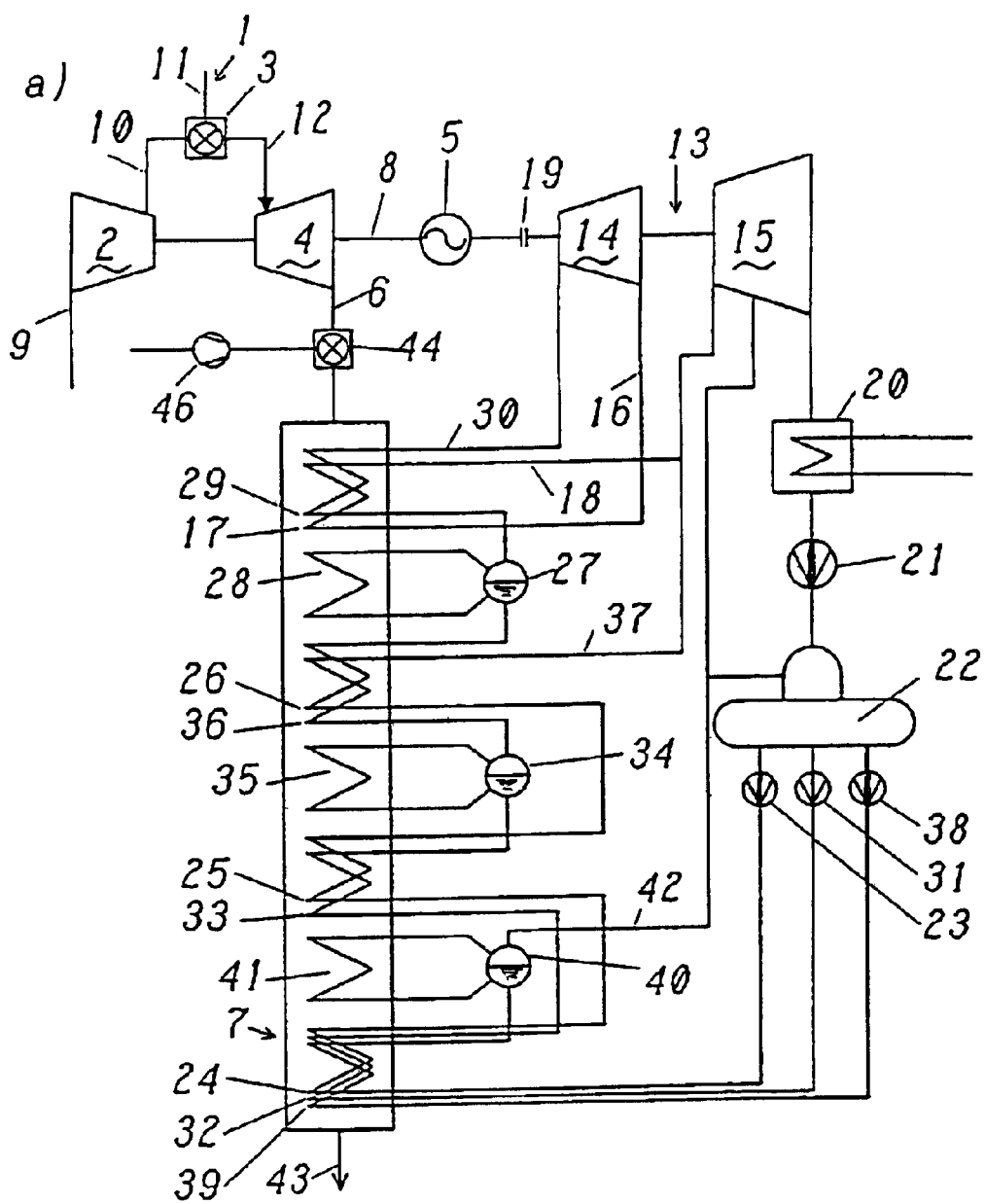
FIGS. 1a–1c shows a general schematic of a combined-cycle power station with an supplemental firing and a fresh air supply fan.
Figure 1:
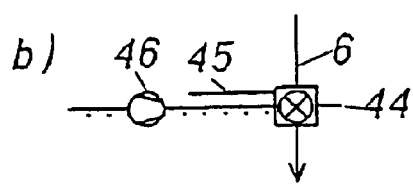
Figure 1:
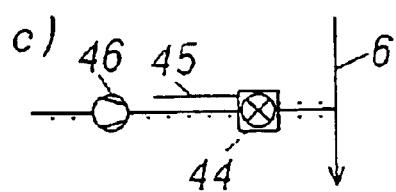

FIG. 1a) shows a schematic illustration of a combined-cycle power station, with a gas turbo group 1 and a steam turbine 13 acting on a common generator 5. The two-phase circuit, for example a water/steam circuit, with a heat recovery steam generator 7 and a steam turbine system 13, is in the form, for example, of a three-pressure process with intermediate superheating 17.

The combined-cycle power station as shown in FIG. 1a) has a gas turbo group 1, whose exhaust gas 6 is supplied to a heat recovery steam generator 7. The gas turbo group 1 comprises a compressor 2, a combustion chamber 3 and a turbine 4. The turbine 4, the compressor 2 and the generator 5 are arranged on a common shaft 8. The turbine 4 drives both the compressor 2 and the generator 5 via this common shaft 8. The air which is supplied to the compressor 2 via an induction air line 9 is passed, after being compressed in the compressor 2, as combustion air 10 into the combustion chamber 3. Fuel which is supplied via the fuel line 11 is burnt in the combustion chamber 3. The hot gas 12 which is produced in the combustion chamber 3 is passed to the turbine 4, where it is expanded producing work.

A gas turbo group may also have two or more combustion chambers and two or more turbines. For example, in the case of gas turbines with sequential combustion, a high-pressure combustion chamber with a high-pressure turbine may be followed by a low-pressure combustion chamber with a low-pressure turbine. A gas turbo group may also have two or more compressors, between which intermediate coolers are arranged.

The steam which is produced at two or more pressure levels in the heat recovery steam generator 7 is supplied via the respective fresh steam lines 30, 37, 42 to a steam turbine 13. After being partially expanded in the high-pressure turbine 14 of the steam turbine 13, the high-pressure steam is supplied via the cold intermediate superheater steam line 16 to the intermediate superheater 17 for the heat recovery steam generator 7, where it is superheated and is supplied via the hot intermediate superheater steam line 18, together with the medium-pressure steam, to the medium-pressure/low-pressure steam turbine 15 in the steam turbine system 13.

This steam turbine 13 comprises a high-pressure turbine 14 and a medium-pressure/low-pressure turbine 15. In the present case, the steam turbine 13 likewise drives the generator 5 via a coupling or clutch 19. The gas turbo group 1 and the steam turbine 13 may, of course, each have their own generator. In this case, more than one gas turbo group with an associated waste-steam boiler may also be combined, for example, with a steam turbine.

The steam which is processed in the steam turbine 13 flows into a condenser 20. Once the output steam has been condensed in the condenser 20, the condensate is fed by the condensate pump 21 to the supply water container/degasser 22, where it is degassed and stored.

The high-pressure supply pump 23 feeds supply water from the supply water container/degasser 22 to a first high-pressure economizer 24, after which it flows to the second high-pressure economizer 25, to the third high-pressure economizer 26 and from there to the high-pressure steam drum 27. The high-pressure steam drum 27 is connected to the high-pressure evaporator 28. The high-pressure steam drum 27 is also followed by a high-pressure superheater 29, to which the high-pressure fresh steam line 30 is connected, which leads to the high-pressure turbine 14 of the steam turbine 13.

A medium-pressure supply water pump 31 feeds supply water from the supply water container/degasser 22 to a first medium-pressure economizer 32, after which it flows to the second medium-pressure economizer 33 and from there to the medium-pressure steam drum 34. The medium-pressure steam drum 34 is connected to the medium-pressure evaporator 35. The medium-pressure steam drum 34 is also followed by a medium-pressure superheater 36, to which the medium-pressure fresh steam line 37 is connected, which leads to the medium-pressure/low-pressure turbine 15 of the steam turbine 13.

The low-pressure supply pump 38 feeds supply water from the supply water container/degasser 22 to a low-pressure economizer 39, from where it flows to the low-pressure steam drum 40. The low-pressure steam drum 40 is connected to the low-pressure evaporator 41. The low-pressure steam drum 40 is connected to the low-pressure fresh steam line 42, which likewise leads to the steam turbine 13. The low-pressure steam is likewise used for degassing the condensate in the supply water container/degasser 22.

A heat recovery steam generator comprising drum circulation evaporators has been described here. Those skilled in the art will, however, also be immediately familiar with through-flow evaporators, and "once-through" evaporators.

FIGS. 1b) and 1c) show two possible versions of the supplemental firing 44 with a fresh air supply fan 46. In the situation illustrated in FIG. 1b), the supplemental firing 44 is located, analogously to FIG. 1a), directly in the exhaust gas line 6 between the gas turbine 4 and the waste-boiler 7, with the corresponding fuel line 45.

The supplemental firing 44 may also be arranged outside the actual exhaust gas path from the gas turbo group, as is illustrated in FIG. 1c). The air which is fed from the fresh air supply fan 46 and the burnt gas from the supplemental firing 44 can be added to the exhaust gas 6 from the gas turbine either before it enters the heat recovery steam generator 7 or else at any desired point within the heat recovery steam generator 7. In this case, the fresh air supply fan 46 must be operated in order to operate the supplemental firing 44 even when the gas turbo group 1 is in operation. Alternatively or additionally, an supplemental firing can also be arranged within the heat recovery steam generator 7, preferably upstream in the flow direction of the exhaust gas 6 of the heat exchanging surfaces of a pressure stage. In this case, the fresh air supply fan can feed the air, compressing it, either directly to the supplemental firing, or upstream of the supplemental firing or the supplemental firing, for example it can also feed fresh air into the exhaust gas path. The fresh air supply fan may, however, also be arranged in a suction mode, downstream from the heat recovery steam generator 7. A suction fresh air supply fan can also be used as a booster when the gas turbo group 1 is in operation.

The configuration of the described two-phase circuit, of the heat recovery steam generator 7, of the gas turbo group 1 and of the steam turbine 13 should be regarded only as an example since, as is generally known, components and systems such as these may have widely differing configurations.

When these systems are not in use, particularly over a lengthy time period, suitable maintenance of readiness is of interest. During shut-down periods of, for example, several days, for example over weekends or holiday periods, on the one hand protective maintenance of readiness is worthwhile, in the sense of, for example, preventing corrosion damage or else frost damage in the components of the two-phase circuit, in particular in water/steam circuits. A further object is to provide a capability in particular for placing the complex and thermally inert two-phase circuit in a state, or to maintain it in a state, which allows rapid starting and loading of the entire power station.

On the basis of a comprehensive analysis, the two objects can be combined such that specific states and media and enthalpy flows can be produced and maintained in the two-phase circuit.

The other figures show the combined-cycle power station as illustrated in FIG. 1 with emphasis on various secondary systems which are of importance for the maintenance of readiness according to the invention; the invention will be explained in more detail in the following text with reference to these figures. All of these figures show the same combined-cycle power station, with the various secondary systems being illustrated in separate figures, in order to improve the clarity of the complex overall system. The individual method steps can and should, of course, being combined with one another in combined-cycle power stations in which the respective systems are used.

Figure 2:
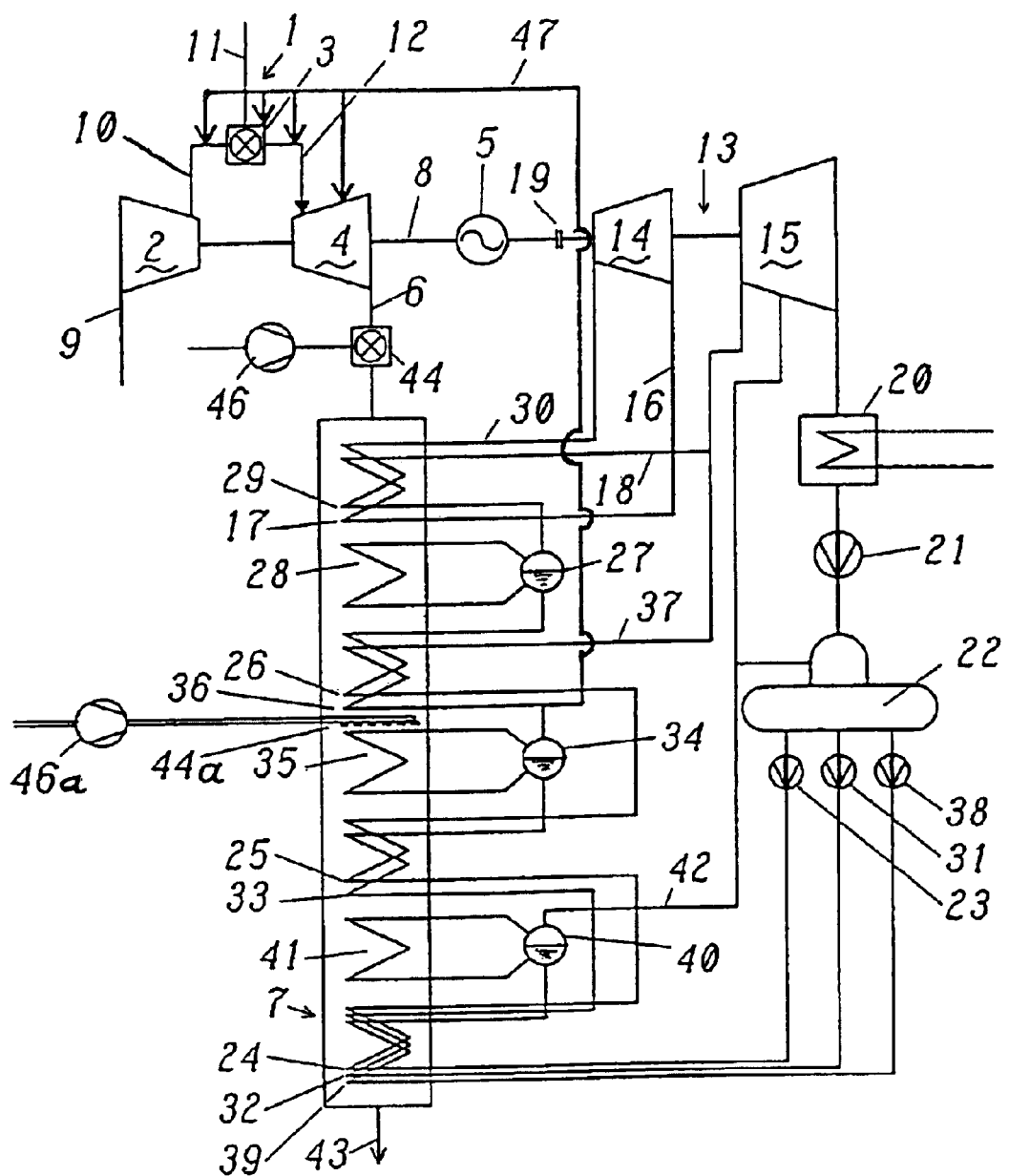
FIG. 2 shows a schematic as shown in FIG. 1, showing the steam injection lines.

Gas turbo groups in which steam is introduced into the working gas are known from the prior art. In this case, this steam may then be used in advance in an open cooling system for the gas turbo group. The steam that is used should be available as soon as possible after the starting of the gas turbo group, on the one hand for cooling but also to provide a steep power output gradient. FIG. 2 shows the use of an supplemental firing 44a with a fresh air fan 46a in the heat recovery steam generator 7 in order to provide steam even when the gas turbo group 1 is not in use. The supplemental firing 44a, which is arranged immediately upstream of the medium-pressure evaporator 35 in the flow direction, heats and evaporates the working medium in the medium-pressure steam system. The fresh air supply fan may in this case blow the air in either upstream of the heat recovery steam generator 7 in the flow direction of the exhaust gas 6 or upstream of the supplemental firing 44a within the heat recovery steam generator 7, or else, as stated here, may feed the air directly to the supplemental firing 44a. When two or more supplemental firings 44, 44a are used, it is also possible to provide a single fresh air supply fan for all the supplemental firings. A steam line for steam injection 47 into the gas turbo group 1 is tapped off after the medium-pressure steam drum 34 and can be used to inject steam into the combustion air 10, the combustion chamber 3, the hot gas 12 and the gas turbine 4. Since, when steam is injected, the steam must be introduced into the working medium for the gas turbo group 1, the corresponding pressure conditions must be borne in mind first of all. For efficiency reasons, it is also expedient for the steam temperature to be as high as possible. The heat recovery steam generator 7 and the supplemental firing should thus be designed, and should be capable of being operated while the system is not in use, such that steam can be produced at a pressure of 20 to 50 bar, particularly preferably at 30 to 40 bar, and at a temperature in the range from 300 to 600° C., particularly preferably in the range from 450 to 540° C.; an supplemental firing 44*a*, which is arranged within the boiler 7 and acts directly on the appropriate evaporator 35 or superheater, with a fresh air supply fan 46*a* is thus preferred in the present case. According to the invention, with the given configuration, the supplemental firing 44*a* and, possibly, the medium-pressure supply pump 31 are operated while the combined-cycle power station is not in use, in order to provide an amount of steam with the appropriate states.

Figure 3:
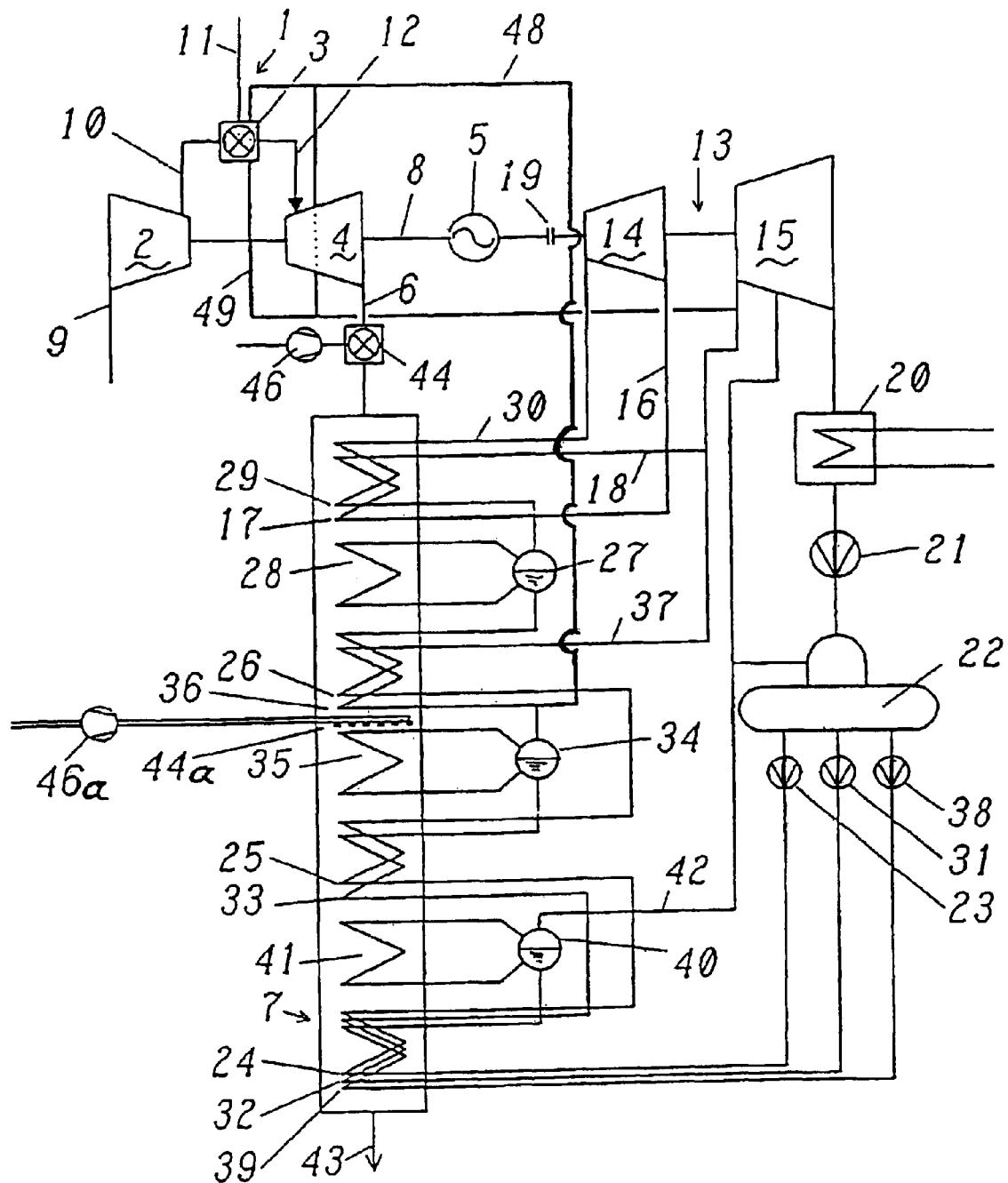
FIG. 3 shows a schematic as shown in FIG. 1, showing the lines for a closed steam cooling system.

FIG. 3 illustrates the use of the method according to the invention for providing the steam for a closed steam cooling system for the gas turbo group 1, as is known by way of example from EP 062 932. After flowing through the gas turbo group 1, the steam is supplied via a steam line 49 to the medium-pressure/low-pressure steam turbine 15. The temperatures of the steam on entering the gas turbo group 1 are in this case preferably in the range from 250 to 450° C., and in particular are about 300 to 400° C. After flowing through the gas turbo group 1, it should be possible to use the energy of the steam without any further water injection. The steam temperatures at the outlet from the gas turbo group 1 should thus not exceed 600° C., and should preferably be in the range from 520 to 580° C. The typical pressures in steam cooling systems are 20 to 50 bar. The heat recovery steam generator 7 and the supplemental firing 44 should thus be configured and should preferably be operated while the system is not in use such that steam is produced at a pressure of 20 to 50 bar, in particular from 30 to 40 bar, and at a temperature in the range from 250 to 450° C., in particular in the range from 300 to 400° C.

Figure 4:
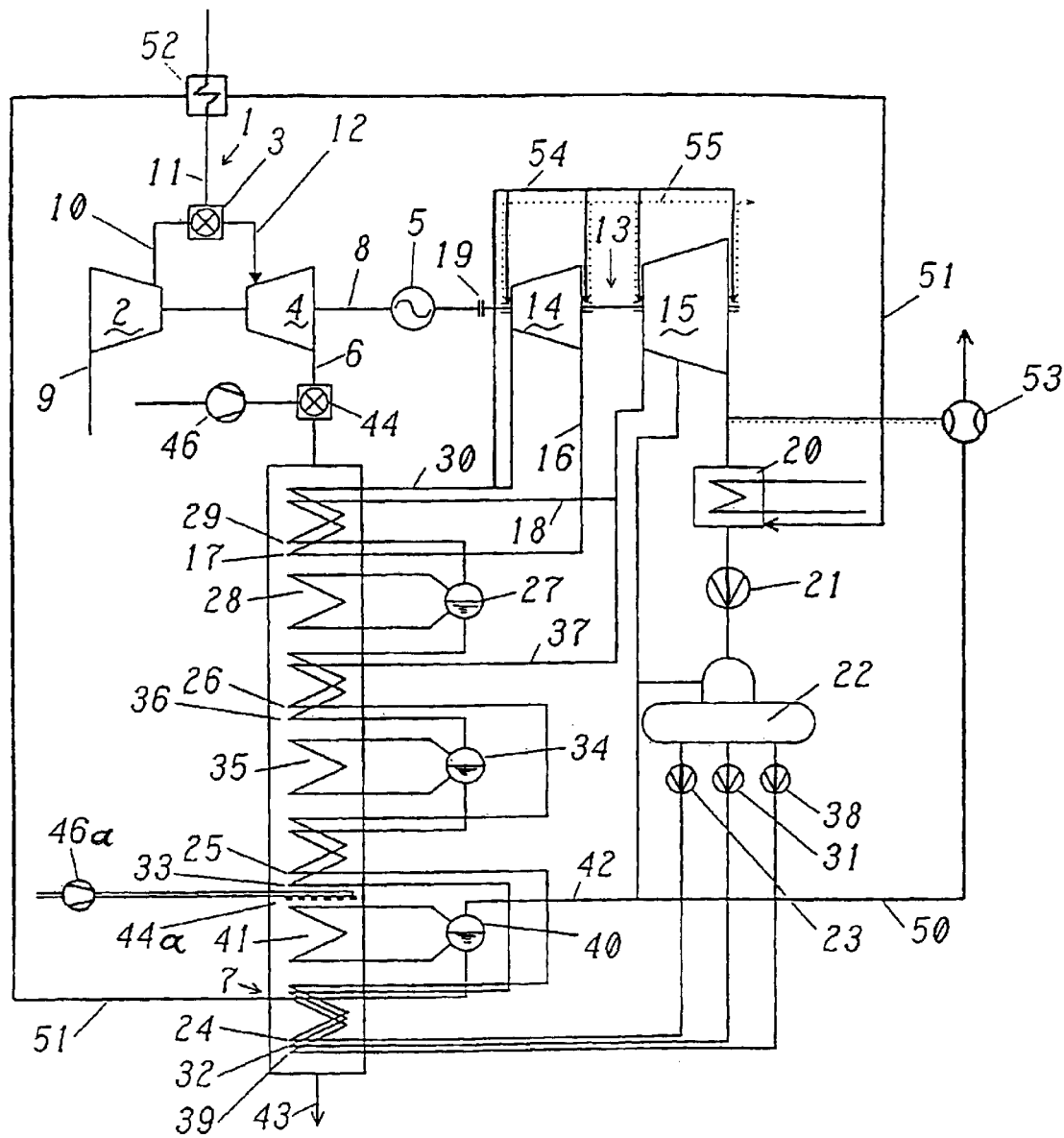
FIG. 4 shows a schematic as shown in FIG. 1, showing the fuel preheating, barrier steam system, and evacuation system.

FIG. 4 shows a barrier steam system 54 for the steam turbine, as well as an evacuation ejector 53 with the associated steam line 50, and a fuel preheater 52, which is fed with heating medium via a hot steam or liquid line 51. During operation, steam is passed via the barrier steam system 54 to the shaft seals for the steam turbine 13, thus preventing air from entering via the low-pressure shaft seals, and preventing steam from emerging to an excessive extent from the high-pressure shaft seals. It is also desirable to prevent air from entering while the power station is not in use, in order in particular to prevent corrosion damage. In the illustrated system, according to the invention, the high-pressure supply pump 23 and the supplemental firing 44 are operated at least intermittently, in order to provide an adequate amount of barrier steam for the barrier steam system. A barrier steam at a pressure of more than 2 bar and in particular at a pressure of more than 4 bar, is preferably provided in this case. This makes it possible to prevent any possible ingress of air at least via the shaft seals. The operation of the supplemental firing 44, which is arranged upstream of the heat recovery steam generator, of course influences all the heating surfaces 17, 24, 25, 26, 28, 29, 32, 33, 35, 36, 39, 41 within the heat recovery steam generator 7 and heats the medium contained in them. The intermittent or continuous operation of the supply pumps 23, 31, 38 and of the condensate pump 21 when the combined-cycle power station is not in use distributes the heat that is supplied to the medium in the boiler 7 throughout the entire two-phase circuit. The operation of the supplemental firing 44 and of the pumps is in this case controlled such that a specific temperatures are not exceeded at different points in the two-phase circuit, for example so as to prevent freezing of the medium, in particular water, in the lines even during a long shut-down period and in extreme ambient temperatures. Alternatively, the supplemental firing and the pumps are operated so as to maintain a sufficient pressure to prevent the opening of emptying facilities and/or venting facilities, and thus largely to prevent the ingress of air. The coupling of the two control systems in such a way that the two conditions are still satisfied is obvious to a person skilled in the art. The supplemental firing and the supply and feed pumps are then operated so as to maintain states and medium flows which are suitable for preventing damage during periods in which the power station is not in use, in particular as a result of corrosion and frost, without any need to take further complex measures, which frequently interfere with normal operation, such as the addition of corrosion protection chemicals and antifreeze chemicals. The ejector 53 is used during starting of the two-phase circuit to evacuate that part of the two-phase circuit, in particular the condenser 20, which is located downstream from the low-pressure steam turbine 15. For this purpose, an amount of driving steam 50 is passed through the ejector. There is a delay during starting of the combined-cycle power station as a result of the fact that the steam which is required to evacuate the condenser 20 must be produced first of all, and a volume must then be evacuated; the steam turbine 13 cannot be started and loaded until this has been done. Normally, this also necessitates the gas turbo group 1 being kept at a lengthy holding point at a comparatively low power output level. According to the invention, an amount of steam for evacuation of the condenser can be provided or maintained even before the system is started, by operation of an supplemental firing 44 or 44*a* with a fresh air supply fan 46, 46*a*. The condenser can thus be evacuated while the combined-cycle power station is not in use, and this may result in a considerable reduction in the starting time and the time before which the system can be loaded. In the described case, a fuel preheater 52 also requires heating steam or liquid 51. While this is of secondary importance during operation of the gas turbo group with combustion gas in the starting phase, the fuel preheating is operationally necessary to produce and maintain the capability of the fuel to flow when burning heavy oil or diesel oil in extreme outside temperatures. According to the invention, an supplemental firing is operated when the combined-cycle power station is not in use, in order to provide an appropriate heating medium, and thus to ensure readiness for starting. The ejector and the fuel preheating normally require water or steam at a low pressure and temperature, for which reason both are tapped off at the downstream "cold" end of the heat recovery steam generator 7. These media may on the one hand be provided via the supplemental firing 44, which, however, also acts on all the upstream heating surfaces, and thus only very indirectly. An supplemental firing 44*a*, which is arranged further downstream in the waste-heat burner 7 and has a fresh air supply fan 46*a*, can be controlled more directly and thus has a better effect. In this case, the supplemental firing and the pumps are preferably operated such that the pressure of the driving steam 50 is at least 6 bar, and in particular is more than 10 bar. While the system is not in use, supply water at a temperature of preferably 140 to 210° C., in particular in the range from 160 to 190° C., is provided for the fuel preheater.

Figure 5:
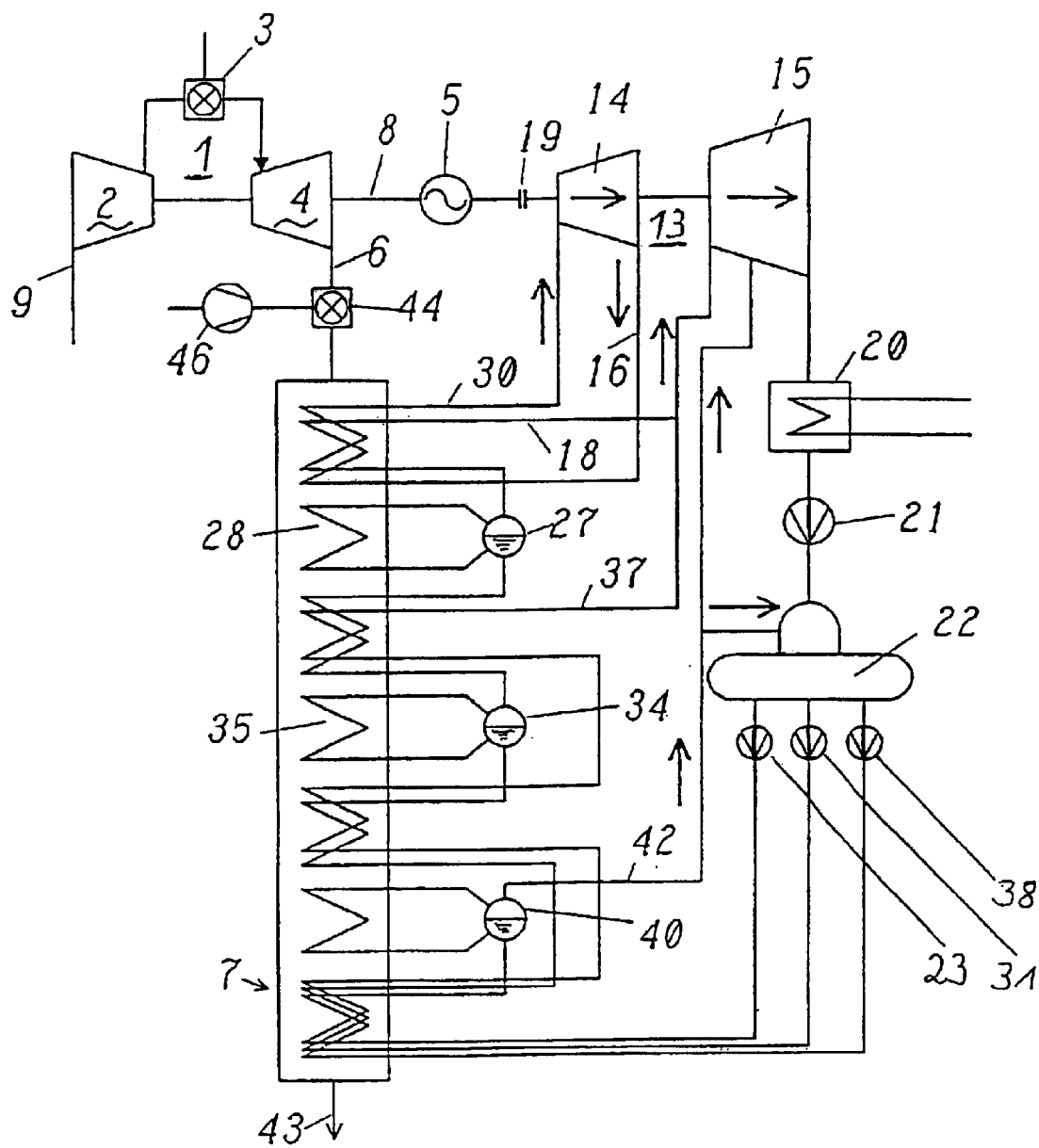
FIG. 5 shows a schematic as shown in FIG. 1, showing the media flows to maintain the heat of thick-walled components and to provide and maintain degassed supply water.

FIG. 5 shows the capability to keep thick-walled parts of the system in the two-phase circuit warm, and to provide degassed supply water, while the combined-cycle power station is not in use. The most suitable supplemental firing 44 for this purpose, with a fresh air supply fan 46, is located upstream of a heat recovery steam generator 7. The arrangement of the supplemental firing 44 on the exhaust gas side upstream of the heat recovery steam generator 7 ensures that the entire heat recovery steam generator 7 is kept warm during operation of the supplemental firing 44. Arrows indicate media flows of steam or liquid heated by the supplemental firing 44, which are fed by the supply and feed pumps in order to maintain readiness when the system is not in use. Steam flows via the high-pressure fresh steam line 30 to the high-pressure steam turbine 14, and through this back via the cold intermediate superheater steam line 16 into the heat recovery steam generator 7, where the steam is heated once again, and is then supplied via the hot intermediate superheater steam line 18 to the medium-pressure/low-pressure steam turbine 15. Steam likewise flows via the low-pressure fresh steam line 42 into the medium-pressure/low-pressure steam turbine 15. In this case, the components through which the steam flows are kept warm, and this is particularly important for the thick-walled components, in terms of rapid starting. Thick-walled components such as steam generator drums as well as pipelines and rotors/housings for steam turbine systems are frequently delimiting components in terms of the build up of temperature during the starting of a power station system. They determine the holding points that have been mentioned above, which should be avoided.

Keeping the items warm by a small flow of water or steam can prevent the temperature from falling below specific limit values which, depending on the component, vary in the range between 100 to 400° C., thus creating and maintaining suitable starting conditions. As a rule of thumb, a power station system can be started all the more quickly the higher the initial temperatures. According to the invention, the supplemental firing 44 and the pumps are operated continuously or intermittently when the system is not in use, such that the system parts which must be kept warm are kept at a temperature of at least 150° C., and particularly preferably at a temperature of 250 to 400° C. The degassing of the supply water for a combined-cycle power station takes place in a degasser at a pressure and temperature level of at most 3 bar and 130° C., respectively. It is thus completely sufficient to supply the degasser, which is normally located on the supply water container, with low-pressure steam. While the power station is not in use, the supply water container/degasser 22 is kept in operation via a tapping from the low-pressure fresh steam line 42, so that an adequate amount of degassed supply water is available for rapid starting. In this case, the supplemental firing provides steam for degassing at a pressure from 2 to 8 bar, and particularly preferably at 4 to 6 bar, such that a supply of degassed supply water is provided and maintained when the combined-cycle power station is not in use, thus allowing the two-phase circuit to be brought into use rapidly.

Furthermore, the supplemental firing can also be operated in order, for example, to protect cooling water lines, which are not illustrated, for the condenser against freezing. An amount of heating medium which is produced according to the invention while the power station is not in use also makes it possible to keep the temperature of lubricating oil and/or of bearing points in the gas turbo group 1 and the steam turbine 13 above a specific temperature, so as to ensure the capability of the lubricant to flow during starting, even after a lengthy shut-down period, and in very low outside temperatures, from the start, and to keep the bearing wear during starting low. The heat exchangers and line systems that are required for this purpose are not shown in the drawing, but will be immediately familiar to those skilled in the art. The serviceability of hydraulic systems can also be maintained in a completely analogous manner by keeping the hydraulic fluid warm while the power station is not in use. An amount of steam or hot water which is produced by means of the supplemental firing while the system is not in use can also be used in order to silence external requirements, for heating or process purposes, during the time in which the system is actually not in use, for example for the heating of buildings which are associated with the power station complex, such as workshops and offices, without having to provide specific reserve systems.

LIST OF REFERENCE SYMBOLS

1 Gas turbo group
2 Compressor
3 Combustion chamber
4 Turbine
5 Generator
6 Exhaust gas, exhaust gas line
7 Heat recovery steam generator
8 Shaft
9 Induction air line
10 Combustion air
11 Fuel line
12 Compressed hot gas
13 Steam turbine
14 High-pressure turbine
15 Medium-pressure/low-pressure steam turbine
16 Cold intermediate superheater steam line
17 Intermediate superheater
18 Hot intermediate superheater steam line
19 Coupling or clutch
20 Condenser
21 Condensate pump
22 Supply water container/degasser
23 High-pressure supply water pump
24 First high-pressure economizer
25 Second high-pressure economizer
26 Third high-pressure economizer
27 High-pressure steam drum
28 High-pressure evaporator
29 High-pressure superheater
30 High-pressure fresh steam line
31 Medium-pressure supply water pump
32 First medium-pressure economizer
33 Second medium-pressure economizer
34 Medium-pressure steam drum
35 Medium-pressure evaporator
36 Medium-pressure superheater
37 Medium-pressure fresh steam line
38 Low-pressure supply water pump
39 Low-pressure economizer
40 Low-pressure steam drum
41 Low-pressure evaporator
42 Low-pressure fresh steam line
43 Chimney
44 Supplemental firing
44a Supplemental firing
45 Fuel line
46 Fresh air supply fan
46a Fresh air supply fan
47 Injection steam line
48 Cool steam supply line
49 Cool steam supply line
50 Driving steam line, driving steam flow
51 Heating medium for the fuel preheater 52 Fuel preheater
53 Evacuation injector
54 Barrier steam line
55 Barrier steam outlet

What is claimed is:

1. A method for maintaining a combined-cycle power station ready for start-up, the combined-cycle power station including at least one gas turbo group, at least one heat recovery steam generator for flowing exhaust gas from the gas turbo group therethrough and producing steam thereby, and at least one steam turbine which is driven by the steam from the heat recovery steam generator, with at least one supplemental firing and at least one fresh air supply fan being arranged for the heat recovery steam generator, the method comprising:

operating the supplemental firing during stand-still periods of the power station, continuously or intermittently, in order to set, to maintain, or to set and maintain predetermined states and media flows in a two-phase circuit including the heat recovery steam generator and the steam turbine.

2. The method as claimed in claim 1, further comprising:

operating at least one of feedpumps or supply pumps of the two-phase circuit, continuously or intermittently, during standstill periods of the power station.

3. The method as claimed in claim 1, further comprising:

maintaining the temperature of the medium which is carried in the two-phase circuit above the freezing point of said medium by operating supplemental firing.

4. The method as claimed in claim 1, further comprising:

producing steam by operating the supplemental firing; and operating the supplemental firing to produce sufficient steam suitable for operating sealing steam and sealing vacuum systems of the two-phase circuit.

5. The method as claimed in claim 1, further comprising:

operating the supplemental firing to maintain boiler parameters at a sufficient level to ensure overpressure in the steam systems.

6. The method as claimed in claim 1, further comprising:

operating the supplemental firing to maintain media contained in the cooling systems for the power station above the freezing point of said media.

7. The method as claimed in claim 1, further comprising:

operating the supplemental firing to generate a heating fluid flow; and applying said heating fluid flow to maintain the temperature of components of the two-phase circuit above a predefined minimum temperature.

8. The method as claimed in claim 7, further comprising:

controlling the temperature of a live steam port of the steam turbine.

9. The method as claimed in claim 1, further comprising:

operating the supplemental firing to maintain the temperature of tanks in the two-phase circuit above a predefined minimum temperature.

10. The method as claimed in claim 1, further comprising:

operating the supplemental firing to generate at least one of a flow of steam, a flow of heating liquid or both sufficient for producing a degassed feed water supply.

11. The method as claimed in claim 1, further comprising:

operating the supplemental firing to produce a steam flow sufficient for operating an evacuation ejector of a condenser of the two-phase circuit.

12. The method as claimed in claim 1, further comprising:

operating the supplemental firing for producing sufficient steam for at least one of steam cooling and steam injection of the gas turbo group.

13. The method as claimed in claim 1, further comprising:

preheating a lubricant of at least one of the steam turbine and the gas turbo group with the supplemental firing.

14. The method as claimed in claim 1, further comprising:

operating the fresh air supply fan for purging the heat recovery steam generator and a chimney, in order to further increase the power station startup speed.

15. The method as claimed in claim 5, wherein the boiler parameters comprise a parameter selected from the group consisting of pressures, temperatures, and combinations thereof.

16. The method as claimed in claim 7, wherein the heating fluid flow comprises at least one of a hot water flow and a steam flow.

* * * * *